United States Patent
Dal Farra et al.

(10) Patent No.: US 7,006,617 B1
(45) Date of Patent: Feb. 28, 2006

(54) METHOD OF IMPROVING CONFERENCING IN TELEPHONY

(75) Inventors: Dave Dal Farra, Nepean (CA); Paul Smeulders, Ottawa (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 08/987,216

(22) Filed: Dec. 9, 1997

(30) Foreign Application Priority Data

Jan. 7, 1997 (CA) ............................................. 2194122

(51) Int. Cl.
*H04M 3/42* (2006.01)

(52) U.S. Cl. .................. 379/206.01; 379/202; 379/203; 379/204; 379/205; 379/410; 379/158; 370/406; 370/407; 370/408; 370/409; 370/410; 370/276

(58) Field of Classification Search ......... 379/202–206, 379/410, 158, 286, 88.01, 202.01; 370/406–410, 370/260–263, 286
See application file for complete search history.

(56) References Cited

U.S. PATENT DOCUMENTS

| | | | | |
|---|---|---|---|---|
| 4,648,108 A | * | 3/1987 | Ellis et al. ................... 379/202 |
| 4,741,025 A | * | 4/1988 | Maruyama et al. .......... 379/202 |
| 4,937,856 A | * | 6/1990 | Natarajan .................... 379/158 |
| 5,327,495 A | * | 7/1994 | Shenoi et al. ............... 379/410 |
| 5,369,694 A | * | 11/1994 | Bales et al. .................. 379/206 |
| 5,457,685 A | | 10/1995 | Champion |
| 5,566,238 A | * | 10/1996 | Wagner et al. |
| 5,754,631 A | * | 5/1998 | Cave ........................ 379/88.01 |
| 5,793,755 A | * | 8/1998 | Gupta et al. ................. 370/286 |
| 6,011,783 A | * | 1/2000 | Interrante et al. ........... 370/286 |
| 6,069,943 A | * | 5/2000 | David et al. ................. 379/202 |
| 6,108,412 A | * | 8/2000 | Liu et al. ..................... 379/410 |

* cited by examiner

*Primary Examiner*—Ahmad F. Matar
*Assistant Examiner*—Thjuan P Knowlin
(74) *Attorney, Agent, or Firm*—L. Anne Kinsman; Borden Ladner, Gervais LLP (57) ABSTRACT

A conferencing method not requiring additional or dedicated hardware in a processor controlled telephone terminal, nor requiring an external conference bridge, is provided by one of the terminals designating the conference, processing signals from two other conferees and delaying only two of the conferees active talkers at any given time. The two active conferees do not receive their own signal. An active conferee remains declared active during a dynamic hangover time, which varies between a minimum and a maximum corresponding to the activity time of the conferee.

13 Claims, 11 Drawing Sheets

METHOD OF IMPROVING CONFERENCING IN TELEPHONY

BACKGROUND OF THE INVENTION

1. Field of the Invention

The present invention relates to conferencing in telephony and the like in general and in particular to methods of providing conferencing. More particularly still, it relates to methods of providing conferencing without dedicated hardware, but utilizing and controlling existing components of a subscriber's terminal. Therefore, neither dedicated additional conferencing hardware, nor an external network conference bridge, is needed.

2. Prior Art

The simplest approach to conferencing involves applying fixed gain to each participant's transmitted signal, with the sum of the scaled signals being provided to each participant's receive (listening) path. In such a scenario, the background noise of all participants is accumulated in the received signals. If there are many participants, the noise can be excessive and unpleasant. There is also strong risk that echo signals will be sent back to the talker, with gain added. The amount of gain that can be applied is also seriously limited by loop stability criteria. Remote CO parties in a conference will often be interconnected over twice the connection loss compared to a point to point call. Given this extra loss, the amount of fixed gain allowed by stability criteria when using a simple summer is very often insufficient to meet level requirements for good quality speech.

Advantageous prior art conference talker switching decisions are based upon the order in which active talkers participate, not upon their level, thus treating all talkers more fairly. First-come, first-serve operation occurs wherein the most recently active pair of transmitted signals have Automatic GAIN control (AGC) applied, and subsequently mixed for redistribution. The presently active pair only hear one another while others hear both active talkers. Subsequent talkers break into the conversation when either of the two most-recently active talkers cease activity. Therefore, the background noise from a maximum of only two locations is heard at any time.

Better methods discriminate echo from speech, allowing the application of large quantities of gain without stability penalties. The only stability criteria that must be met involve the two presently-active talkers. All other participants are free to receive full gain as required. This is the method used in the present invention and in the United States prior art U.S. Pat. No. 4,648,108.

U.S. Pat. No. 4,648,108 granted Mar. 3, 1987 to Ellis et al. and entitled "Conference Circuits and Methods of Operating Them" discloses a conference circuit having a plurality of ports for a corresponding plurality of conferees. Associated with the ports is a control circuit which determines whether a conferee is active, i.e. talking, or dormant, i.e. listening. The circuit applies gain to the "active" signals and attenuates the "dormant" signals. When a listener starts to talk, the circuit switches his port to the "active" mode. Difficulties arise in determining when a listener becomes active, due to noise and echo with the speech signal. They are mitigated by comparing the signal from the port with an echo signal estimate derived from the echo return loss for the transmission path associated with the port. The arrangement takes account of differing echo levels for different transmission paths.

In U.S. Pat. No. 4,648,108 a microprocessor is used in the conference bridge, but all other hardware is additional and dedicated.

U.S. Pat. No. 4,648,108 is incorporated herein by reference and is useful as a background to the present invention and defines many of the terms used herein.

SUMMARY OF THE INVENTION

The present invention endeavours to provide conferencing methods not requiring additional or dedicated hardware in a processor-controlled telephone terminal, nor requiring an external conference bridge. This is particularly advantageous where the number of conferees is small.

According to the preferred method of the present invention, the "bridging" (or voice-path mixing) function occurs within the conference originator's terminal. The originator is therefore termed the "chair" of the conference.

According to a narrower aspect of the preferred method, conferee participants may include, in addition to the chair, two of the three available control office (CO) lines; or one CO line and one of the two available intercom lines.

Features of the present method include:

Valid talker activity is detected for each port. Signal processing techniques are used to discriminate a valid talker's voice from echo and noise.

A talker-order dependent approach is used (as opposed to a talker-level dependent approach) to determine which active talkers may participate at any given moment. The two most-recently active talkers can partake. The most recent talker is deemed "Priority A", and the previous talker is "Priority B". Priority A has certain privileges above those of Priority B, explained later herein.

Level estimation is used to determine the amount of automatic gain control to be applied to each talker's signal prior to being broadcast to the other conferees.

The Priority A and Priority B signals are mixed and broadcast. Priority A and Priority B are never sent their own signal.

Accordingly, an improved method for providing conferencing capability between a plurality of telephone terminals (conferees) using a microprocessor in one of said telephone terminals, comprises the steps of: (a) said one of said telephone terminals originating a telephone conference with two other telephone terminals; (b) said microprocessor processing signals emanating from said two other telephone terminals and declaring two conferee signals from two of said plurality telephone terminals active talker signal; (c) causing said active talker signals to be transmitted to telephone terminals other than their own; and (d) said steps carried out exclusively in said microprocessor.

According to another aspect of the improved method, step (b) includes the step of providing a dynamic hangover time during which a conferee signal continues to be declared an active signal.

According to a further aspect, the improved method further including the step of echo-return-loss (ERL) estimation periodically for each conferee but updating an ERL estimate only if a recently received minimal talker signal level exceeds a predetermined minimum ERL threshold.

BRIEF DESCRIPTION OF THE DRAWINGS

The preferred embodiment of the present invention will now be described in conjunction with the annexed drawing figures, in which.

DETAILED DESCRIPTION OF THE PREFERRED EMBODIMENTS

Before proceeding to describe the detailed flow-charts in the drawings, the important aspect of talker activity detection and other technical considerations are discussed. In the preferred embodiment, activity is detected if three factors are met:

The speech envelope level (SENDIN) is above a pre-set threshold. Based upon the results of numerous loop and network loss/noise studies, the lowest acceptable average input level for activity is set here to −50 dBm. This covers all foreseeable loop loss and talker level combinations while providing robust discrimination from noise. Envelope detection is implemented simply as 4 ms averages to decrease real-time processing consumption; but if processor capacity is ample this restriction is not necessary.

The incoming signal (SENDIN) is not an echo of a transmitted signal. Some estimate of the echo return-loss (ERL) for the connection is required, and it is computed regularly.

Signal envelope value (SENDIN) is larger than the present estimate of the noise by an amount greater than the noise margin.

Should these conditions be satisfied for at least two frames (8 ms), the conferee's port is flagged as active. Should one of the above tests fail, the port is considered to have no active speech, and thus no "activity". A counter is maintained which increments throughout periods of continuous activity, and is cleared once activity is no longer present. Should activity cease, a port is flagged as inactive only after the inactivity has remained throughout the hangover period.

The echo return-loss (ERL) and noise floor estimates are updated for each port, on a frame-by-frame basis. The key to robust detection is robust echo and robust noise detection.

Activity Detection and Echo Immunity

The echo estimate is updated only if the minimum of the most recent few (here eight) RECEIVEOUT averages (the level sent out by the algorithm after AGC gain is applied, the minimum of the few averages being MINRECEIVEOUT) is larger than a minimum ERL threshold, here set to −40 dBm0. Further, the echo estimate is only updated if the level received (the 4 ms SENDIN average) is greater than the present noise estimate at that input. This ensures that the echo path estimate is not driven by noise when noisy lines and high echo path loss are present. If the two tests are satisfied and the port is inactive, the ERL estimate is ramped up or down at 2 dB/sec, according to whether the present ERL estimate is smaller or larger than MINRECEIVEOUT−SENDIN.

The ERL initialization is at 10 dB. Since activity is determined by comparing input level to echo levels, this ensures echo discrimination for those conditions where the noise floor is high and the far end speech levels are low. Where line echo cancellers are used, this estimate is not so high that echo could falsely be declared as speech at conference outset.

Activity Detection and Noise Immunity

The noise floor estimate is based upon 32 ms averages. The present noise floor estimate is compared against the most recent 32 ms average of the port's SENDIN signal (SENDIN_32 ms). If the noise floor estimate is greater, it is ramped down at 50 dB/sec, and if it is larger, it is ramped up at a much slower rate. In fact, as in the U.S. Pat. No. 4,648,108 (although it used a 4 ms frame average), a dual-rate increase is used. Initially, the ramp-up rate is 2 dB/sec, for the first 800 ms. If the ramping remains positive throughout that period, a rate 5 dB/sec is subsequently used in order to stabilize the estimate sooner. The noise estimate is updated every 4 ms.

By having a slow rate of noise averaging (32 ms averages) noise immunity is improved by smoothing out the temporal variations. Since the decay rate is ten to 20 times faster than the attack rate for the noise estimate, this method is more robust against noise spikes that repeat within a 32 ms time frame. This is motivated by field reports of impulsive "fuzzy sounding" noise, where lock-out may occur to (a situation wherein valid talkers are prevented from breaking into the conversation due to some unusual condition).

Port activity is tested for by ensuring that SENDIN is larger than the noise estimate by an amount greater than the noise margin. The noise margin value decreases as the noise floor estimate increases. This allows easier talker break-in for high noise environments, which should greatly reduce instances of 'lock-out'. It also provides better immunity from false activity detection on low level noise. The noise margin is determined as follows:

Noise margin=max (6,−14−(Noise Estimate/2)) dBm if noise estimate≦−76 dBm0, noise estimate=−76 dBm0

Advantageous use is also made of dynamic hang time. Prior art used a fixed hang time where regularly spaced impulsive noise could potentially "hog" the conference. This occurs when impulses are falsely detected as speech and then not declared inactive before the next impulse occurs due to the fixed long hangover needed for speech. With speech, short hangovers are not optimal as they could lead to front end clipping of words. Here short hangover times for shorter activity periods, and longer hangover times for longer periods are used. Since AGC gain is preferably held constant during inactivity as long as no new talkers appear, there is no risk in this method causing background noise pumping. The hangtime relationship is simply equal to the activity time, with a minimum of 12 ms (for activity times less than 12 ms) and a maximum of 100 ms (for activity times greater than 100 ms). Activity is declared after 8 ms of successive activity detection. This prevents very short impulsive signals such as the tapping of a pencil from incorrectly being declared a Priority A or B talker.

Since the noise decay rate is at least ten times faster than the attack rate, the noise estimate is preferably initialized at 0 dBm. This ensures speedy noise estimate convergence at conference onset.

The dynamic hangover time, 8 ms activity requirement, and noise estimation based on the past 32 ms of input signal level, combine to minimize the adverse effect of random impulsive noise on the seemingly non-switched or "seamless" operation of the conference.

Talker Sequencing

Once activity has been accurately declared, the next decision concerns the manner in which the ports may participate.

The method determines which active talkers may participate based on the time-order in which they are active rather than the intensity of their activity. Participants that have low voices or who are on long transmission loops are not at a disadvantage. The talker sequencing strategy ensures that up to two talkers are actively participating at any time. By only allowing two talkers at any one time, the background noise from only two locations is present in the output signal.

The most recent talker is assigned the highest priority, priority A. The previous talker is assigned priority B. The remaining conference participant (priority C) hears the sum of the Priority A and Priority B signals, with each signal independently amplified or attenuated to achieve a target signal level. The priority A talker hears only the priority B talker, the similarly, the priority B talker hears only the priority A talker.

A newly-active talker cannot break into the conversation unless one of the two most recent talkers becomes inactive. Should the priority B talker be inactive, the new talker is promoted to priority B, with B demoted to C. If the priority A talker is inactive, an active priority B talker is promoted to A, and A is demoted to B (if the new B remains inactive, the C talker is promoted to B as described above, but in the next frame). Should both priority A and B talkers be inactive, a new talker is promoted directly to priority A, the former A is demoted to B, and the former B is demoted to C. It is important to emphasize that a talker is not immediately demoted when inactivity is detected at the port. Instead, the talker's priority ranking is maintained until activity is detected on another port, at which time the priority change occurs. The hangover time is used to ensure that short pauses do not present an immediate opportunity for others to break-in. Such pauses naturally occur between words in a spoken sentence.

Automatic Gain Control and Gain Application

Due to the location of the bridging function in the subscriber terminal, the user receives signals attenuated as per a point to point connection. However, the remote conferees on CO line connections experience potentially twice that loss between them. Clearly, an automatic gain control (AGC) strategy is required to normalize signals to some target level at the terminal.

The automatic gain control parameters cover a larger variety of network conditions that reflect the placement in the network at the CPE. Loss and noise from two extra subscriber loops must be considered. The preferred gain/level parameters are:

Maximum Gain=21 dB
AGC Target=−17 dBm
Maximum Loss=22 dB

AGC gain is initialized at 0 dB as a stability guard before the network echo cancellers converge. When a participant activity enters the conference for the first time, a 32 ms level average is taken. The amount of AGC gain required based upon this average is computed. A quick attack is used to bring the participant up to this gain, and therefore they immediately appear at near normal levels. The maximum AGC gain which can be applied at this stage is limited to +7 dB, and the minimum to 2 dB. The algorithm subsequently uses moderate attack and decary rates to smoothly track longer term level variations, with the available gain range extended, for example to ±10 dB. The applied gain tracks the AGC gain in either direction, should the AGC gain change by an amount exceeding a hysteresis window, say of +/−2 dB. This increases robustness against noise which may potentially cause false activity.

Figure 1:
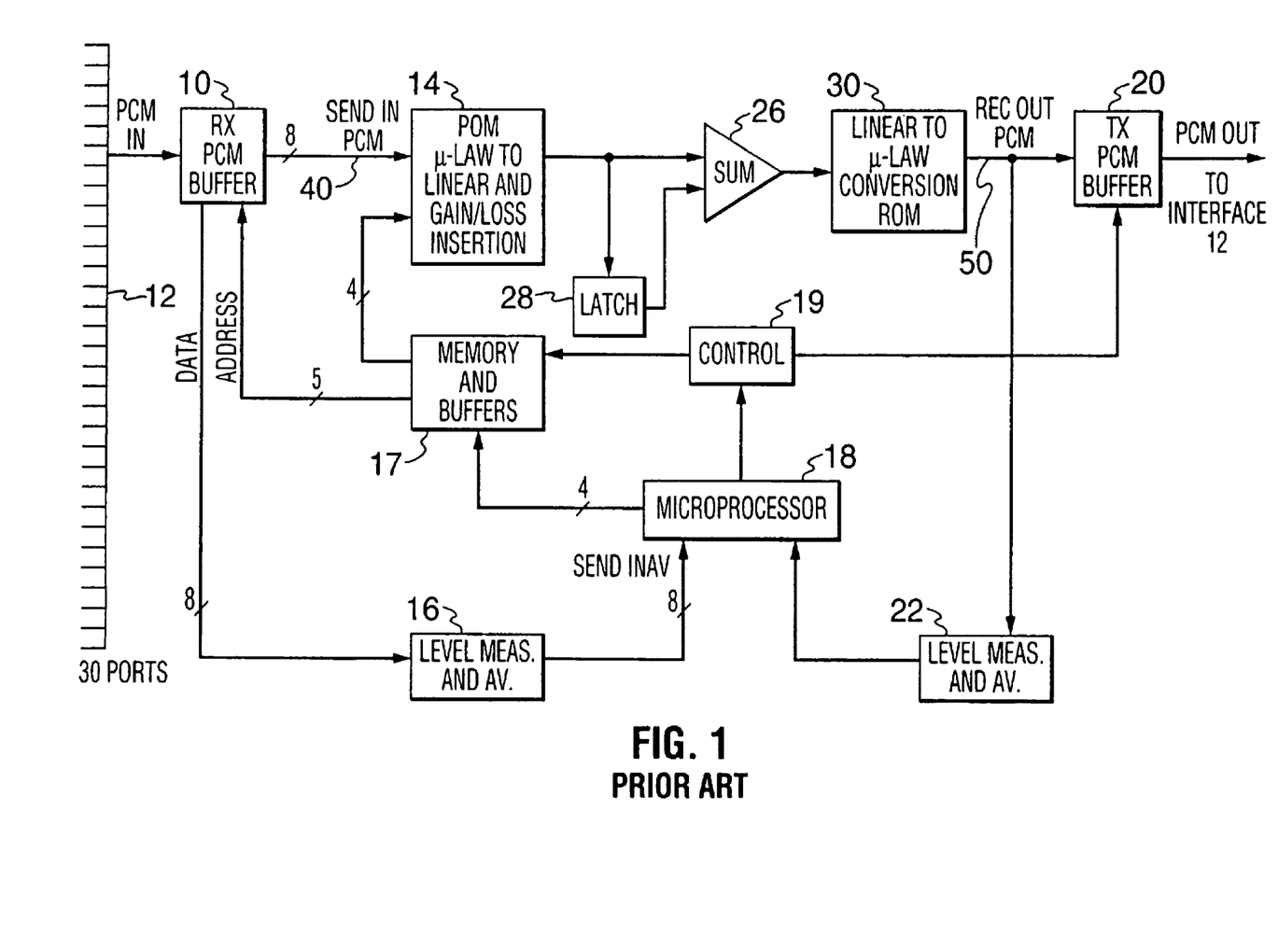
FIG. 1 shows prior art conferencing circuit (FIG. 1 in U.S. Pat. No. 4,648,108)

Referring now to the prior art conferencing circuits shown in FIG. 1, it is seen that the conferencing requires dedicated hardware to scale and mix the received signals. Dedicated hardware also computes frame-oriented power estimates of the incoming (SENDIN) and outgoing (RECEIVEOUT) signals, including linear to logarithmic conversion. The microprocessor operates entirely upon the frame averages to compute the necessary gain to be applied to each port, and to control the voice-path connections. In contrast, in the present preferred method a Motorola DSP56156 processor (operating at 60 MHz) in the host terminal (i.e. the chair's) performs all of the functions fulfilled by the dedicated hardware. Whereas the prior art program executes on a 4 ms interval, the present method can be thought of as consisting of two sections: one which is sample-oriented, and another which is frame-oriented. A "frame" refers to a set of 32 consecutive 8 kHz samples from voice channel, and is therefore 4 ms long. However, the frame-oriented operations are themselves distributed in time, in order to minimize the peak real-time utilization.

In the following description of the flow-charts for the Motorola DSP56156 software, array variables use round brackets to denote particular elements (as in the FORTRAN convention). For example, PRIORITY (2) represents the element with index 2 in the PRIORITY array, and is found in memory location PRIORITY+2. Arrays are indexed starting with 0 to denote the first element. A variable name entirely within round brackets denotes the contents of the memory location referred to within the brackets. Square braces[ ] denote the indirection operator.

Port parameters and variables are stored in arrays of length three, one for each participating port. The first array entry (offset=0) always corresponds to a chair port parameter (port 0), while the remaining entries correspond to parameters for port 1 and port 2, in that order. Ports 1 and 2 can be any of two CO lines or one CO line and one intercom line, although two intercom lines can be supported with no modifications to the present code. The actual hardware mapping of ports depends solely upon the pointers provided by the OS in locations confRXSptrs(+0, +1, +2) and confTXSptrs (+0, +1, +2). The exception to the rule is the array PRIORITY. The port index of the priority A port is stored at PRIORITY+0, priority B port index at PRIORITY+1, and priority C port index in PRIORITY+2. Priority changes are implemented by rearranging the elements of this array. The array elements may only take on values 0, 1 or 2.

Figure 2:
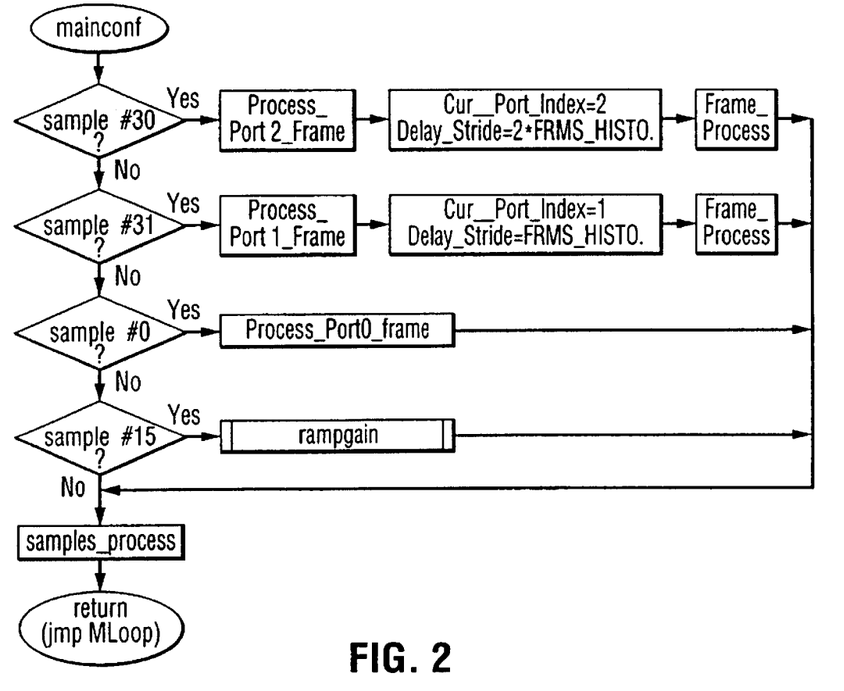
FIG. 2 is an overall flow-chart summarizing the method of providing conferencing according to the present invention.
Figure 3:
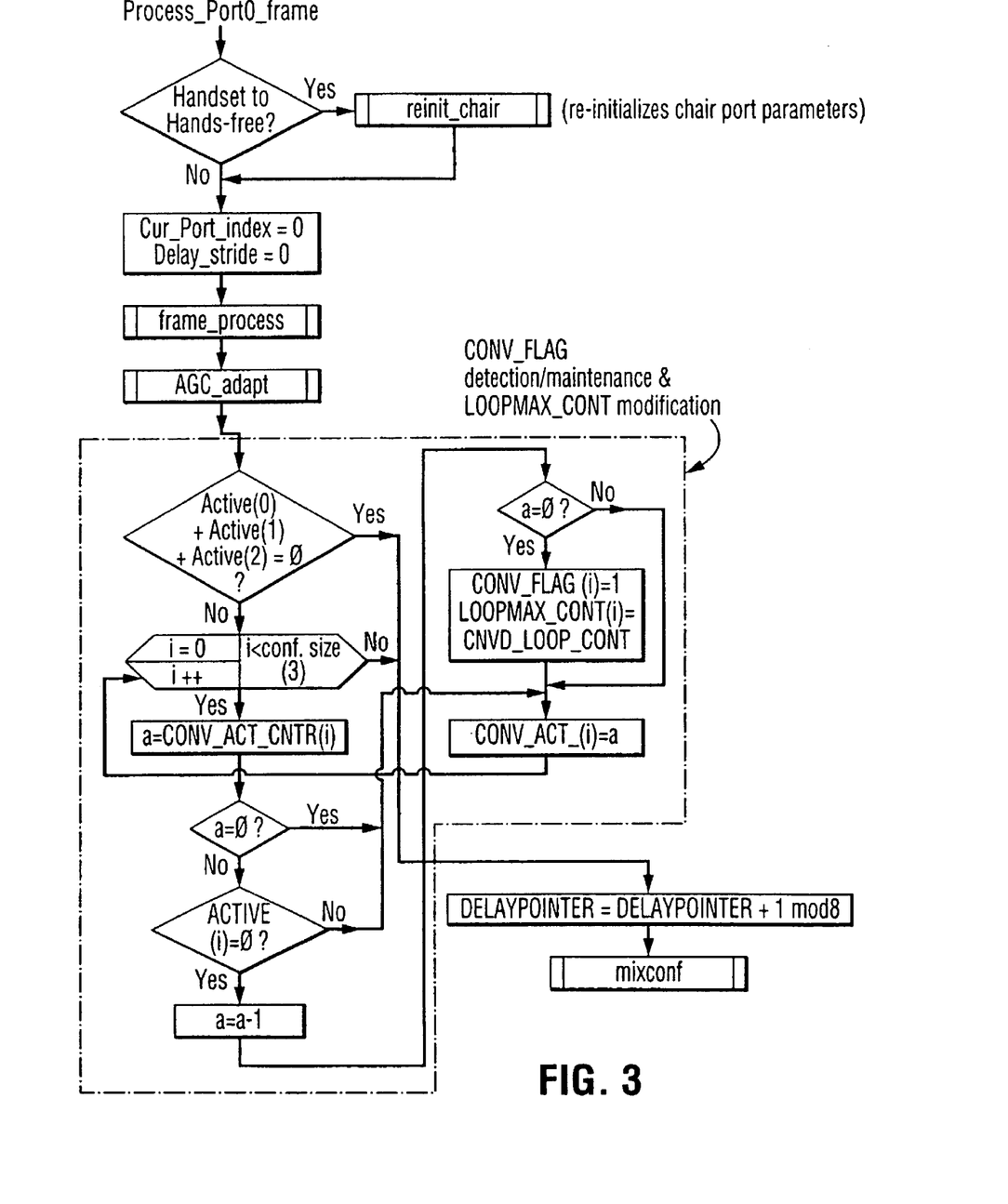
FIG. 3 is a flow-chart detailing the "Process-Portϕ-Frame" block shown in FIG. 2.

Referring to FIGS. 2 and 3, the function "mainconf" is the "mission task" label called by the OS every sample period (125 µs). The program determines which sample within a frame (referenced to the port 0 frame) is currently being processed, and changes program flow to initiate frame-oriented processing, if necessary. For the purposes of frame processing, "frames" for each port are offset from the port 0 frame by −1 sample for port 1, and −2 samples for port 2.

Frame-oriented processing which depends upon the outcome of frame processing for all ports is completed at the end of a port 0 frame. In the LOOPMAX-CONT modification step in FIG. 3, the LOOPMAX can take on two different values per port. Initially 3 dB, and after sufficient (four seconds) LISTENING time (inactive input, but activity heard from other ports), a higher LOOPMAX of 8 dB is subsequently used. This permits higher gains to be applied in the potentially unstable loop between port A and port B, since the Echo cancellers are assumed to be converged. The LOOPMAX is computed for the ports participating in the loop, depending on their individual estimated "converged" states. I.e., LOOPMAX can take on the values of 6, 11 or 16 dB. This significantly reduces perception of switching and gain ramping, and would be a major shortcoming. When frame-oriented processing is completed, the samples-oriented processing commences.

Figure 4:
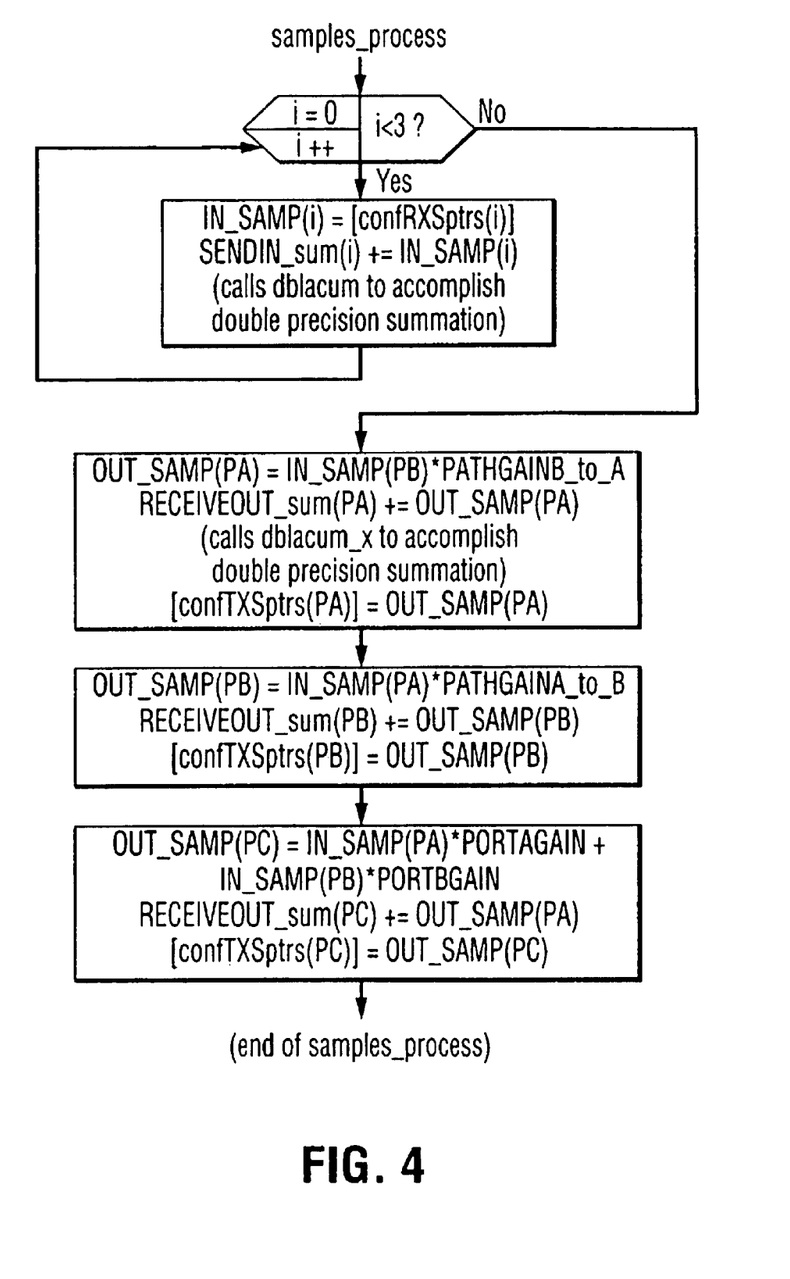
FIG. 4 is a flowchart detailing the "samples-process" block in FIG. 2.

Referring to FIG. 4, the sample oriented operations are handled in the code segment "samples_process". The input samples are read from the input data stream. The output samples are computed for each port, based on their current priority, and the current gain levels for the ports. The double-precision sums for SENDIN_sum and RECEIVEOUT_sum for each port are updated, to be used later in the computation of the SENDIN and RECEIVEOUT averages. The samples are not converted to log scale.

As mentioned above, much of the frame-oriented processing is distributed in time, so that the peak real-time consumption of the program is reduced. Sample numbers are referenced to the port 0 frame. Port 2 frames are processed during sample interval #30, port 1 frames are processed during sample interval #31, and port 0 frames are processed during sample interval #0. Gain ramping is performed during sample interval #15. Not all frame processing can be distributed in this manner. The mixconf function, for example, wherein the activity status of all ports is examined and used to reconfigure the priority structure, must be performed after all ports are processed. The switching occurs during the port 0 frame processing phase. The function "AGC_adapt" is also performed during this interval. In reality, it could be performed during any interval should the peak real-time consumption need further reduction. Little to no effect on conference performance will be perceived.

Frame-oriented processing commences when the target sample intervals are detected. Prior to calling the "frame_process" subroutine shown in FIG. 5, two parameters are written to memory, the current port index (0, 1 or 2) at "Cur_Port_index", and the "delay stride", at "Delay_Stride", which corresponds to the current port index *FRMS_HISTORY. The delay stride is used to aid indexing into the two-dimensional matrix of "delay tables", which hold the most recent FRMS_HISTORY values of SENDIN and RECEIVEOUT averages. A single DELAYPOINTER is maintained and used by all ports to index the most recent elements. To index RECEIVEOUT (port, DELAYPOINTER) the actual address is quickly computed as:

RECEIVEOUT base address+DELAYPOINTER+Delay_Stride

Figure 5:
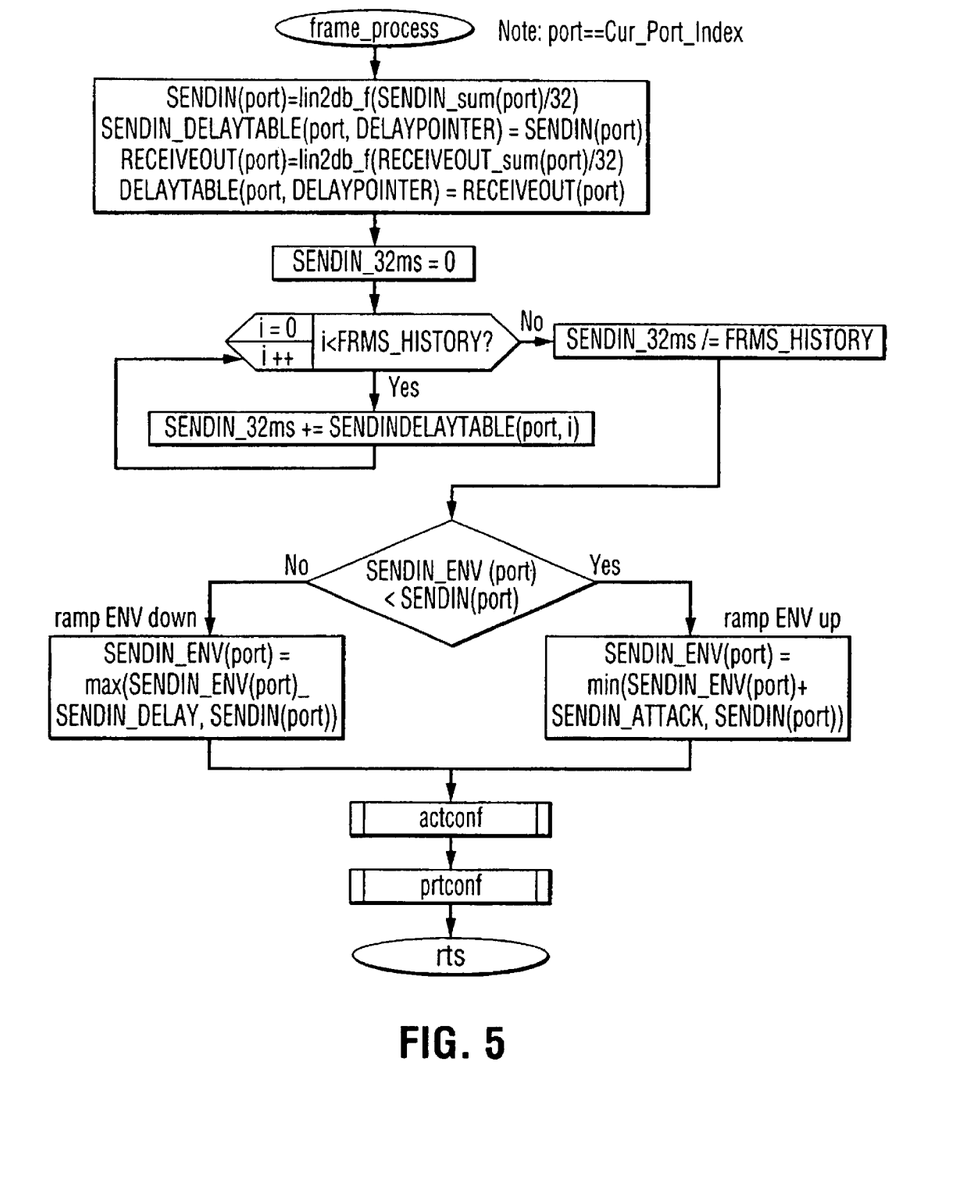
FIG. 5 is a flow-chart detailing the "frame-process" block in FIG. 3.

The subroutine frame_process computes the RECEIVEOUT and SENDIN averages using the sums RECEIVEOUT_sum and SENDIN_sum. The results are converted to log scale, and copies to the respective delay tables. An average of the last FRMS_HISTORY frames of SENDIN averages is computed and stored as SENDIN_32 ms. AGCGAIN is computed based on a longer-term envelope of the received 4 ms averages seen at a port SENDIN-ENV. AGCGAIN ramp rates and envelope rates are suitably tuned to permit fast adaptation, but imperceptible volume wavering. The subroutines "actconf" (FIG. 6) and "nse_erl_adapt" (FIG. 7) are then called.

Figure 6:
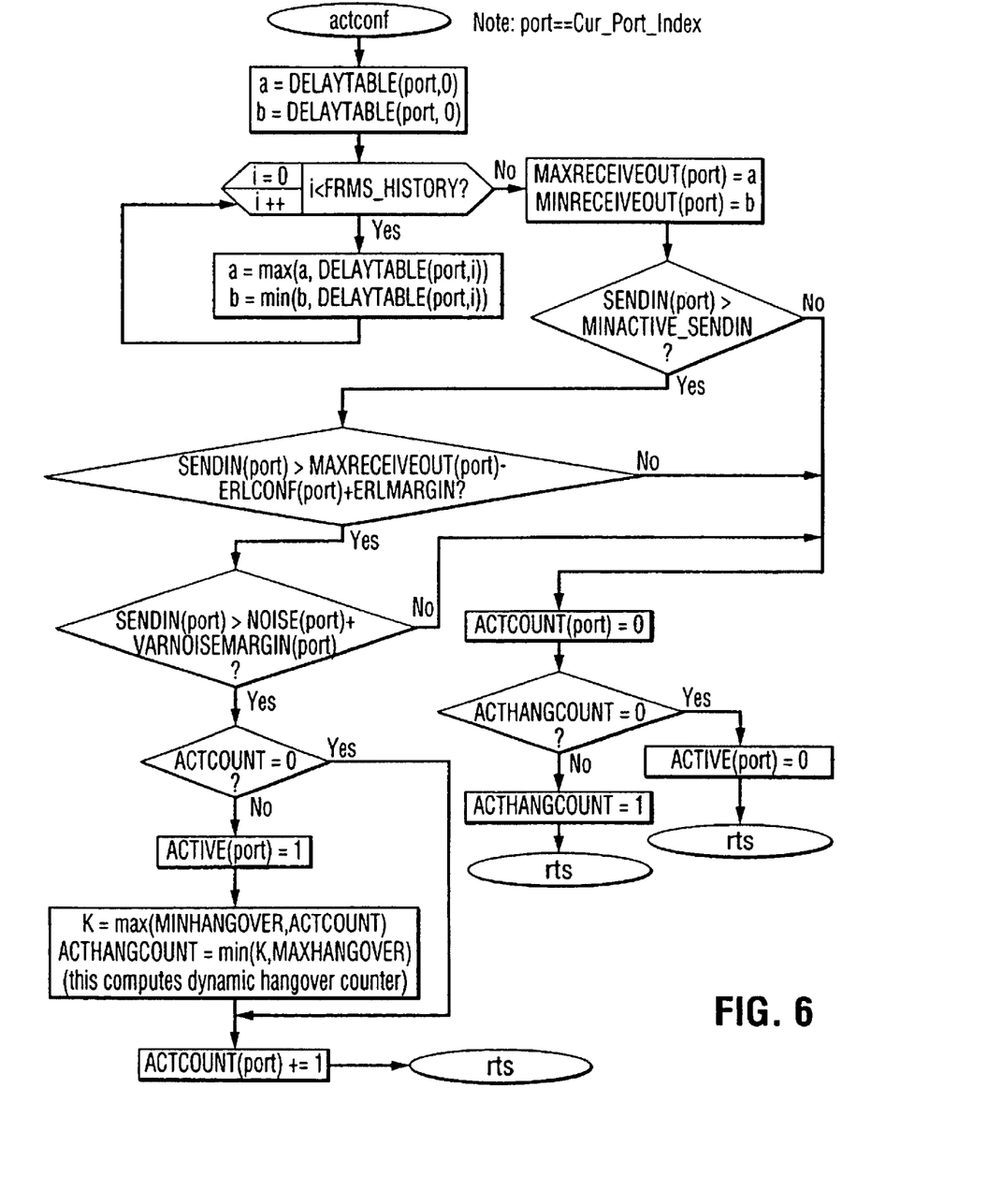
FIG. 6 is a flow-chart detailing the "actconf" block in FIG. 5.

Subroutine "actconf" determines the activity status of the port, and updates the activity flag and activity counter. (Activity detection has the condition, that the input signal 4 ms average at a port (SENDIN) must be greater than a threshold, say, −50 dBm). It also computes the required dynamic hangover counter limit, and maintains the actual hangover counter.

Figure 7:
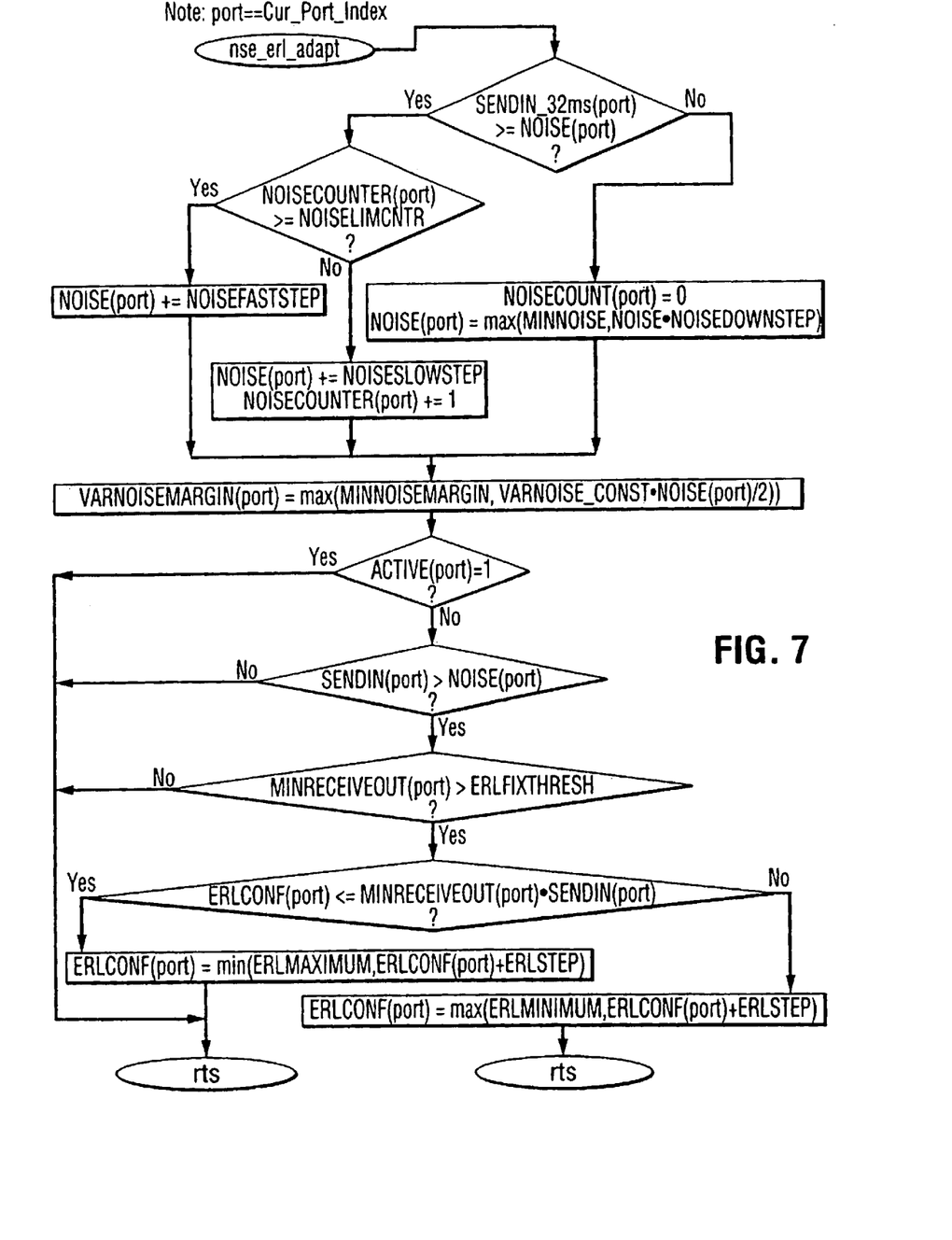
FIG. 7 is a flow-chart illustrating the subroutine for adaptation of the noise-floor and echo return-loss estimates.

Subroutines "nse_erl_adapt" handles adaptation of the noise floor and echo return-loss estimates. ERL is computed when a port is flagged as NOT active.

In the cases of port 1 and port 2 frame processing, the sample processing begins the following the return from "frame_process". Port 0 frame processing continues with the "AGC_adapt" (FIG. 8) subroutine, wherein the AGCGAIN of an active priority A port is adjusted. The common DELAYPOINTER is incremented modulo 8, and the "mixconf" (FIG. 9) subroutine is called, wherein priority changes are made. Since gain values can be changed at this point, it is important that the priority A/B loop is checked for stability. The code segment "loop_adjust" (FIG. 10) is called for this purpose.

Figure 10:
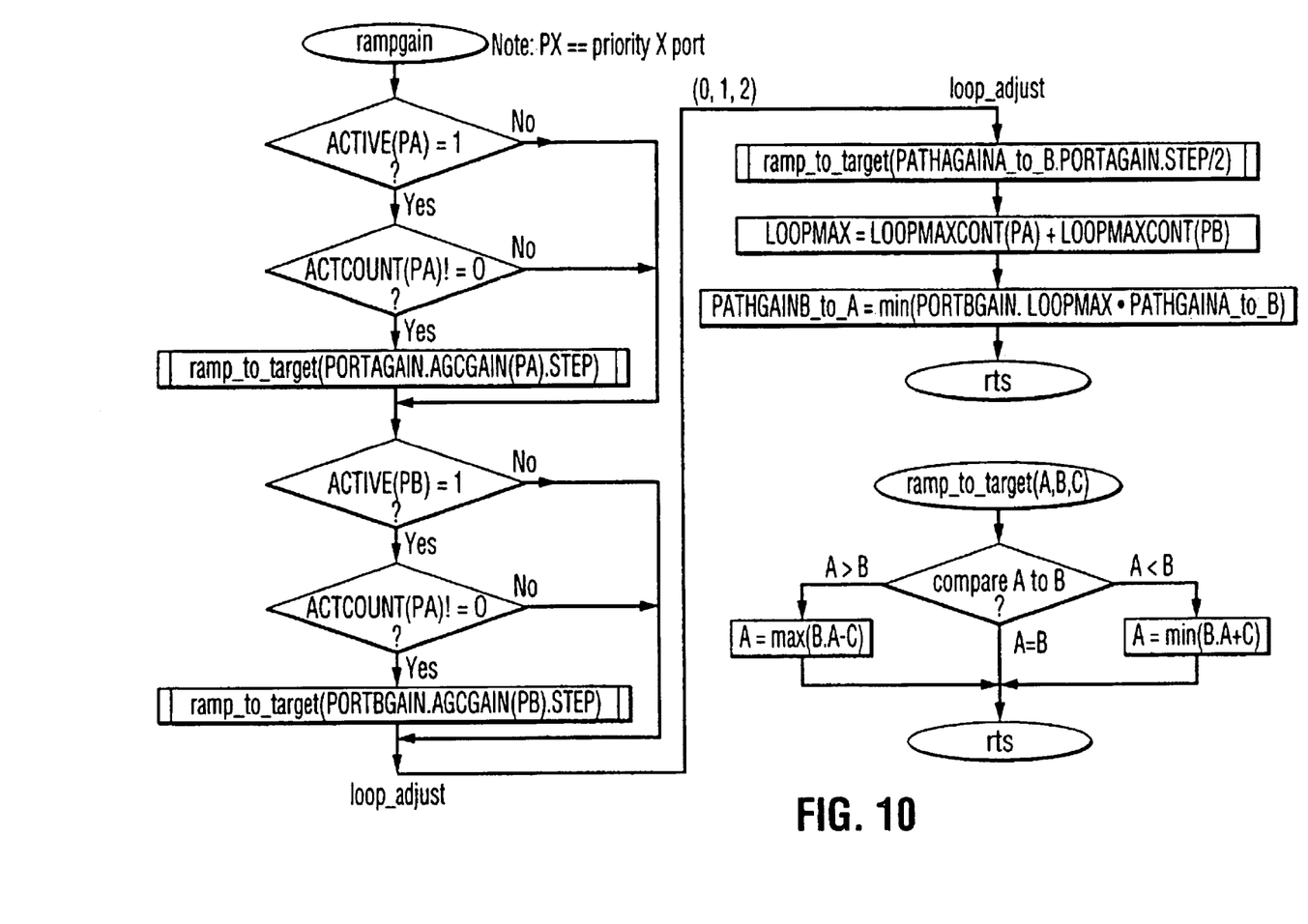
FIG. 10 is a flow-chart detailing the "rampgain" block in FIG. 2.

During sample #15 (referenced to the port 0 frame), the gains PORTAGAIN and PORTBGAIN are ramped toward their respective targets, using the subroutine "rampgain" (FIG. 10). Once again, since the gains change, the priority A/B loop must be checked for stability, and "loop_adjust" (FIG. 10) is called again. Since "loop_adjust" is called twice per frame, the ramp-rate increments based on 4 ms frames, are halved.

Conference Initialization

At each instantiation of a conference call, the conference algorithms operating parameters must be initialized. A program IniConf (in file conf.asm) handles this initialization procedure. All conference data is defined and placed together in the file datconf.asm.

The chair port parameters must be re-initialized when the Venture user switches from handset to hands-free mode during a conference call. Code is provided which re-initializes the chair whenever the Handset-to-Handsfree transition is detected by monitoring the Mission_flags. The following is a brief description of the initial values for the conference parameters. In most cases, the initial value justification is obvious from the context of the parameter. In other cases, brief explanations are given.

The following conference parameters are initialized to 0, for all three array entries each: IN_SAMP, MAXRECEIVEOUT, MINRECEIVEOUT, RECEIVEOUT, SENDIN, DELAYPOINTER, SENDIN_sum, SENDIN_ENV, RECEIVEOUT_sum, DELAYTABLE, SENDIN_DELAYTABLE, ACTIVE, ACTCOUNT, ACTHANGCOUNT, NOISECOUNTER, ADAPT.

The AEC_ON flag is cleared to ensure the Handsfree feature runs in half-duplex mode. LOOPMAX_CONT'S are initialized to their lower value of 3 dB. The convergence counters (CONV_ACT_CNTR) are initialized to 1000 frames (4 seconds), and the converged flags (CONV_FLAGS) are cleared.

The flags ACTIVE_first are initialized to 1 for each port, and will be cleared following the first 32 ms of port activity as priority A.

All gain parameters are initialized to INITGAIN=0 dB, for all ports. They are: AGCGAIN, AGCPREL. The single variables PORTAGAIN, PORTBGAIN, PATHGAINA_to_B, PATHGAINB_to_A are also initialized to INITGAIN.

For all ports, the ERLCONF parameter is initialized to ERLINIT=10 dB, and the VARNOISEMARGIN is initialized to FIXNOISEMARGIN=9 dB.

The initial NOISE estimates are set high, at INITNOISE=0 dBm0. If the initial noise floor is set too low, activity detection is ultra-sensitive at the beginning of the conference. The ramp-up rate for the noise is slow, and the noise floor estimate takes too long to stabilize (about 8 seconds). However, the ramp-down rate is fast, and therefore starting at a high estimate causes rapid convergence to the true noise floor, while at the same time preventing early false activity detection.

Other constants used in the conference are as follows:

The parameter VARNOISE_const=−14 dB. The parameter is used in the computation of VARNOISEMARGIN=VARNOISE_const−NOISE/2.

The variable noise margin is limited to between 6 and 15 dB (MINNOISEMARGIN, MAXNOISEMARGIN). The NOISELIMCNTR is set for an 800 ms delay. Noise ramp-down rate is 50 dB/sec, while the two ramp-up rates are 2 and 5 dB/sec (NOISEDOWNSTEP, NOISESLOWSTEP, and NOISEFASTSTEP, respectively).

All gain parameters are limited to maximum values of +10 dB, and minimums of −10 dB. Applied gains (PORTAGAIN, PORTBGAIN, PATHGAINA_to_B, PATHGAINB_to_A), when ramping, do so at effective rates of 2.9 dB/sec, in both directions.

The ERLFIXTHRESH (fixed threshold) parameter is set to −40 dBm0, while the ERLMARGIN is 3 dB. ERLCONF is limited between ERLMINIMUM=0 dB, and ERLMAXIMUM=25 dB. The minimum input level for activity detection (MINACTIVE_SENDIN) is set to −50 dBm0).

The parameter AGCWAIT is set for a 20 ms delay (5 frames), while AGCWAIT_first is set for 32 ms (8 frames). AGCGAIN ramps up at AGCUPSTEP=2.9 dB/sec, and ramps down at AGCDOWNSTEP=2.9 dB/sec. The AGC hysterisis window is set at HYSTERISIS=2 dB. The AGCREFERENCE=AGCTARGET=−19 dBm0, and the maximum initial AGCGAIN following the first activity as priority A is set to MAXAGC_first=7 dB. This is to limit excessive gain boosting should initial activity be extremely quiet, or if activity is erroneously detected due to unpredictable site conditions. MINAGC_first is set to 2 dB.

Figure 11:
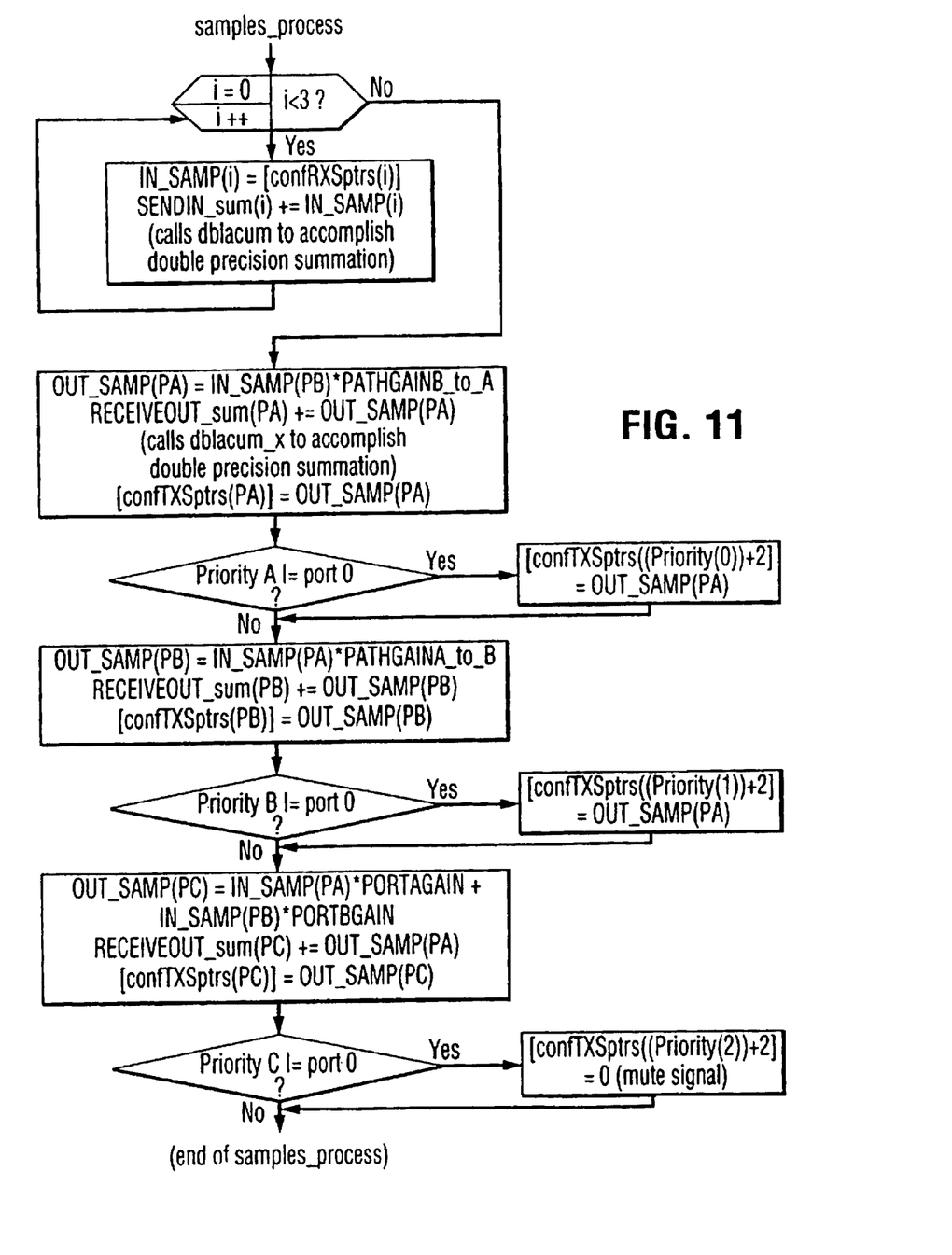
FIG. 11 is an enhanced version of the "samples-process" block (shown in FIG. 4) by means of which virtual stereo may be provided.

FIG. 11 of the drawings shows a Multiple-Source Localization Virtual Stereo enhancement. This feature realizes its most remarkable performance during a conference call. The user, using a stereo headset, hears the other two conference participants in stereo, with their perceived "virtual" locations in two separate positions external to the listener. The conferencing method has been implemented such that the remote participants' signals are sent to separate memory locations following appropriate gain application. Signals from the remote conferees are amplified but unmixed, to be used as input data by the MSL-VSE routine.

As far as the conference is concerned, the MSL-VSE feature is always running, and it computes the MSL-VSE input data as part of the samples_process routine. The locations confTXSptrs+3 and confTXSptrs+4 must be written with pointers to locations where the MSL-VSE expects its speaker 1 and speaker 2 input data, respectively. The port 1 signal is provided to [confTXSptrs+3], and port 2 signal is provided to [confTXSptrs+4]. As in the case of basic conference initialization, it is the operating system's responsibility to correctly update the pointers whenever the user enables or disables the MSL-VSE feature. Addition of user sidetone for MSL-VSE is not handled in the conference code, and is assumed to be added into the listening path by a dedicated sidetone function.

What is claimed is:

1. An improved method for providing conferencing capability between a plurality of telephone terminals, comprising:
    (a) originating a telephone conference between a host telephone terminal and two other telephone terminals;
    (b) in a microprocessor in said host telephone terminal, processing signals emanating from said two other telephone terminals to detect active talker signals issuing from said two other telephone terminals and said host terminal;
    (c) declaring only two conferee signals from two of said active talker signals; and
    (d) causing said conferee signals to be transmitted to telephone terminals other than their own while causing signals not declared conferee signals to be inactive; said steps being carried out exclusively in said microprocessor without use of dedicated hardware and without use of an external conference bridge.

2. The improved method as defined in claim 1, wherein step (b) includes the step of providing a dynamic hangover time during which a conferee signal continues to be declared an active signal.

3. The improved method as defined in claim 2, said dynamic hangover time having a lower and an upper limit corresponding respectively to talker activity time less than a predetermined minimum and more than a predetermined maximum.

4. The improved method as defined in claim 3, said predetermined minimum and maximum being approximately 10 milliseconds and 100 milliseconds, respectively.

5. The improved method as defined in claim 1, further including the step of echo-return-loss (ERL) estimation periodically for each conferee but updating an ERL estimate only if a recently received minimal talker signal level exceeds a predetermined minimum ERL threshold.

6. The improved method as defined in claim 5, said minimum ERL threshold being approximately −40 dBm0.

7. The improved method as defined in claim 5, said ERL estimate being updated also only if an average signal level received at a conferee port is greater than a current noise level estimate at said conferee port.

8. The improved method as defined in claim 2, further including the step of echo-return-loss (ERL) estimation periodically for each conferee but updating an ERL estimate only if a recently received minimal talker signal level exceeds a predetermined minimum ERL threshold.

9. The improved method as defined in claim 3, further including the step of echo-return-loss (ERL) estimation periodically for each conferee but updating an ERL estimate only if a recently received minimal talker signal level exceeds a predetermined minimum ERL threshold.

10. The improved method as defined in claim 4, further including the step of echo-return-loss (ERL) estimation periodically for each conferee but updating an ERL estimate only if a recently received minimal talker signal level exceeds a predetermined minimum ERL threshold.

11. The improved method as defined in claim 8, said ERL estimate being updated also only if an average signal level received at a conferee port is greater than a current noise level estimate at said conferee port.

12. The improved method as defined in claim 9, said ERL estimate being updated also only if an average signal level received at a conferee port is greater than a current noise level estimate at said conferee port.

13. The improved method as defined in claim 10, said ERL estimate being updated also only if an average signal level received at a conferee port is greater than a current noise level estimate at said conferee port.

* * * * *

UNITED STATES PATENT AND TRADEMARK OFFICE
CERTIFICATE OF CORRECTION

| | | |
|---|---|---|
| PATENT NO. | : 7,006,617 B1 | Page 1 of 1 |
| APPLICATION NO. | : 08/987216 | |
| DATED | : February 28, 2006 | |
| INVENTOR(S) | : Dave Dal Farra et al. | |

Figure 8:
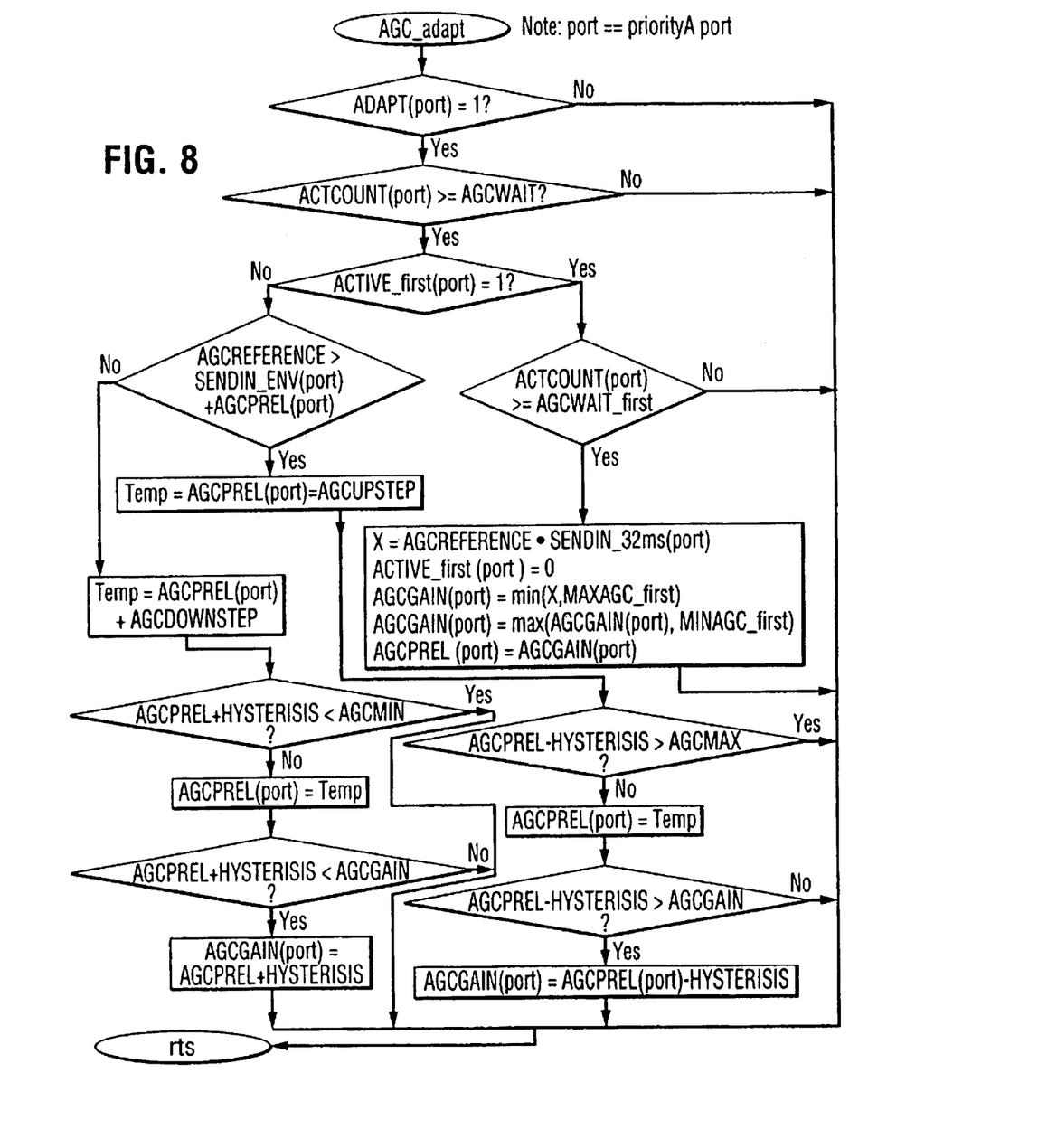
FIG. 8 is a flow-chart detailing the "AGC-adapt" block in FIG. 3
Figure 9:
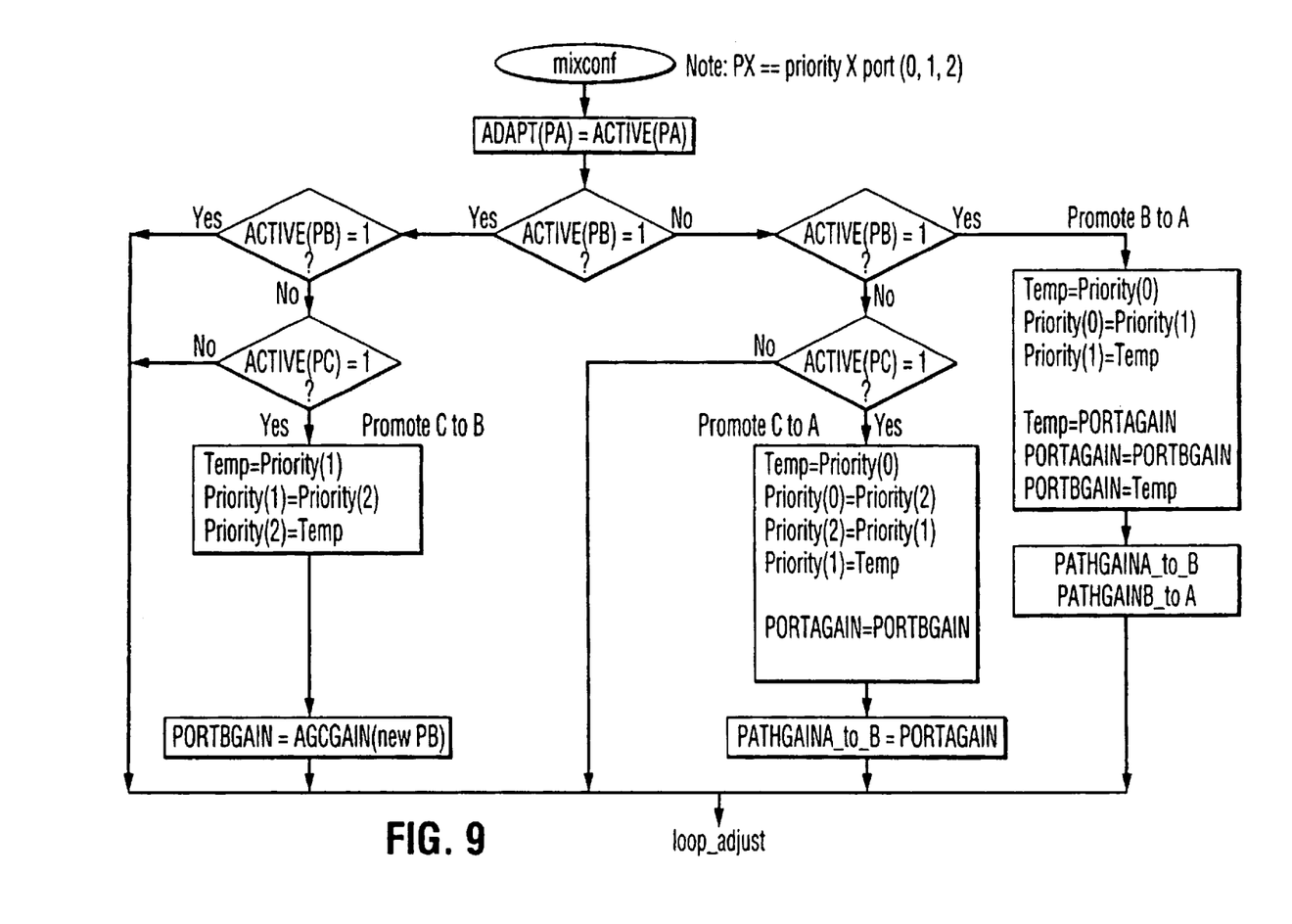
FIG. 9 is a flow-chart detailing the "mixconf" block in FIG. 3.

It is certified that error appears in the above-identified patent and that said Letters Patent is hereby corrected as shown below:

Title page, item (30), foreign priority application data, delete "2194122" and insert therefor --2194512--;

Column 3, line 13, figure 8, insert --;-- after the number "3".

Signed and Sealed this

Thirty-first Day of July, 2007

JON W. DUDAS
*Director of the United States Patent and Trademark Office*